Filed Dec. 18, 1962 2 Sheets-Sheet 1

INVENTOR
DALE L. CRITCHLOW

BY Stephen J. Limanek
ATTORNEY

United States Patent Office 3,209,261
Patented Sept. 28, 1965

3,209,261
TRANSMISSION SYSTEMS

Dale L. Critchlow, Lincolndale, N.Y., assignor to International Business Machines Corporation, New York, N.Y., a corporation of New York Filed Dec. 18, 1962, Ser. No. 245,544
3 Claims. (Cl. 325—58)

Figure 1:
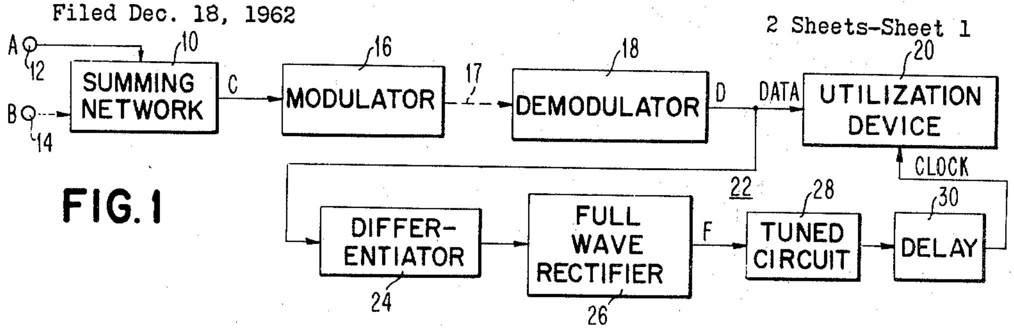

This invention relates to data transmission systems and more particularly to improved clocking circuits for use in digital data transmission systems.

In order to eliminate or at least minimize the erroneous detection of data pulses representing various items of information in a communication system, accurate timing information is required at the receiver of the system. To develop proper timing information in the receiver of a digital data transmission system clocking means are provided which generate at the receiver a clock signal having a repetitive wave-shape synchronized in frequency and phase with the rate at which the data signals are received.

Many techniques have been devised which attempt to eliminate or minimize a time-wise discrepancy, which is often referred to as jitter, between the received data signal and the clock signal. One such system utilizes a separate transmitted clock wave which is received, detected, and squared at the receiving station to form the desired clock signal. Synchronization between the data signal and the clock signal is essential in this system and a separate channel for clock signal transmission is required. In other systems no special clock wave is transmitted but a phase comparison is made between the output of a receiver generator and a frequency reference, such as a tuned fork, and any error signal developed is fed back to synchronize the generator. This system is capable of producing a very precise clock signal but it is not particularly simple to implement and accuracy with regard to the received data signal is not assured.

In a system described in a commonly assigned copending U.S. patent application, Serial No. 190,670 by E. Hopner, filed April 27, 1961, entitled, Clock Signal Generator, there is described a circuit for generating a clock signal at the receiver of the transmission system from data transitions at the data signal frequency with a relative independence from the effects of jitter. In the system of the copending application, data signals which pass through a detector and a low pass filter of the receiver are applied to a full wave rectifier, a frequency selective amplifier, a tuned circuit and a squaring or clipping circuit, the output of which provides uniform clock pulses. The signals from the full wave rectifier are used as the driving signals in the clock generator since they have a high harmonic content, a compônent at the frequency of the data bit rate being prominent therein. The selective amplifier is tuned to this component frequency to emit a wave, the frequency of which corresponds to that of the bit period of the received data signal. A clocking circuit somewhat similar to that described in the above-identified application has been disclosed also in a commonly assigned copending U.S. patent application, Serial No. 213,227, filed on July 30, 1962, by E. Hopner and D.H. Rumble and entitled, Transmission Systems.

The clock signal generator described in the above-identified copending application has been found to be very satisfactory for systems which transmit data in binary signal form. However, since the clock generators or circuits of the copending patent applications are dependent upon data transitions, their use is limited to systems which have a coding restriction and furthermore to systems which transmit data having a required frequency of zero threshold crossing.

Data is at times transmitted in waveforms which have several, i.e., more than two levels or amplitudes, for example, four level waveforms having a first given positive level and a second positive level intermediate that of the first positive level and zero, and a first given negative level and a second level intermediate the first negative level and zero. In the four level waveform, each pulse of a unit time duration generally represents two bits of information, the polarity of the pulse indicating one bit or item of information and the amplitude of the pulse indicating the second bit of information. It can be seen that when the four level waveform is used to transmit data, transitions are present which do not provide a zero crossing which could be used for the formation of a clock signal.

Accordingly, it is an objet of this invention to provide an improved transmission system having a reliable and accurate circuit.

It is another object of this invention to provide an improved digital data system which does not require a separate clock channel to correctly identify the signal data.

Still another object of this invention is to provide an improved transmission system having means for providing clock signals which does not require code restrictions on the data format.

A further object of this invention is to provide an improved digital data system which may be used on telephone type transmission lines.

Yet a further object of this invention is to provide an improved transmission system having clocking means which may be used in telephone circuits in dial up applications.

In accordance with the present invention a transmission system is provided in which received signals are utilized to provide a clock signal by differentiating the signals so as to detect points of maximum slope of a transition between two signal levels. In the system of the present invention, the received signals, which may be only data signals or transmitted data and clock signals, are passed through a differentiator to provide an indication of the time of maximum slope of each transition.

An important advantage of the system of the present invention is that a very reliable clock retrieval scheme is provided which may be used for transmission of digital data in telephone dial up applications.

An important feature of this invention is that very accurate and reliable clock pulses can be derived at the receiver by the addition of a simple differentiating circuit to known clock circuits.

The foregoing and other objects, features and advantages of the invention will be apparent from the following more particular description of preferred embodiments of the invention, as illustrated in the accompanying drawings.

Figure 2:
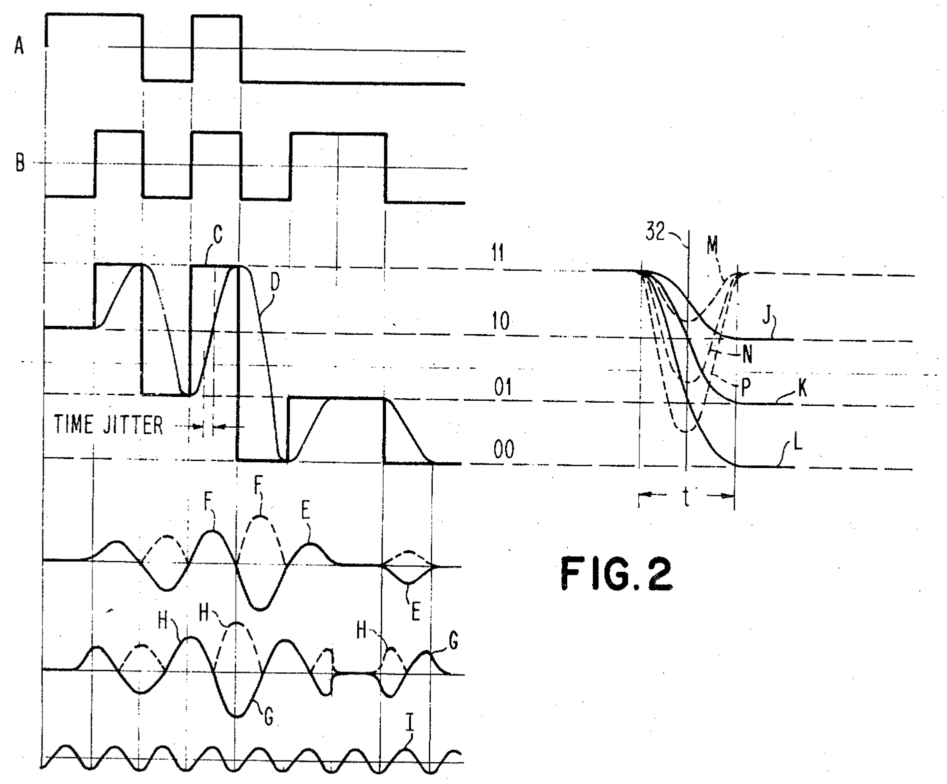
Figure 3:
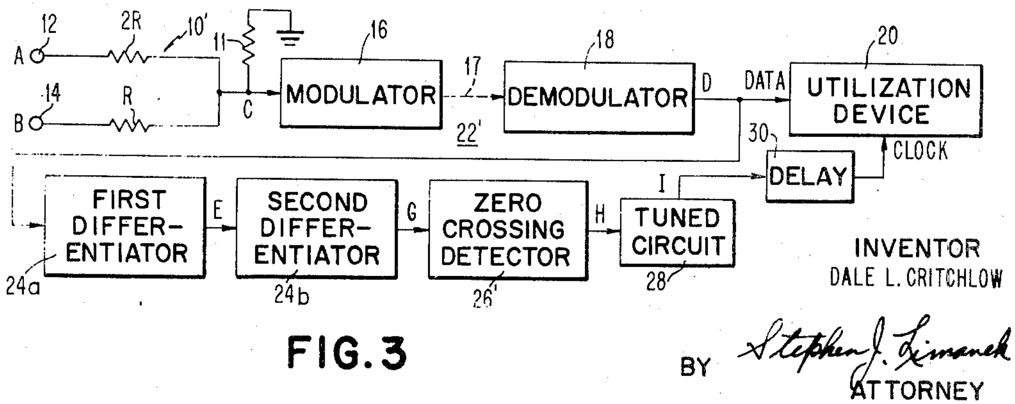
Figure 4:
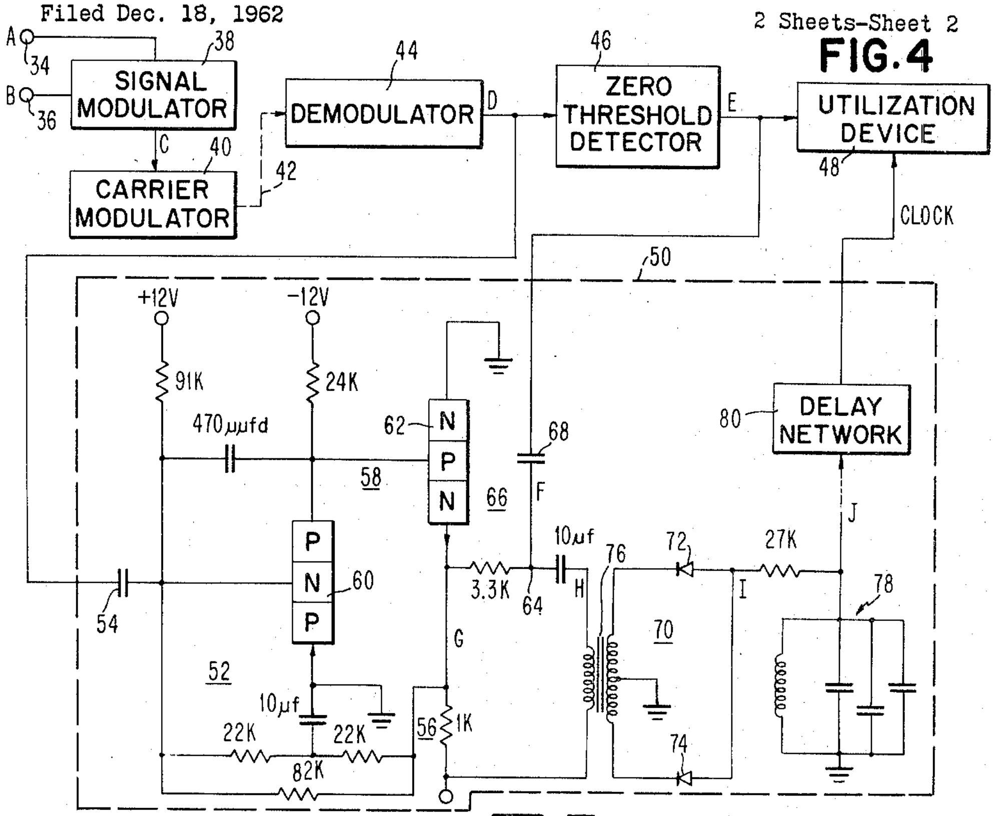
Figure 5:
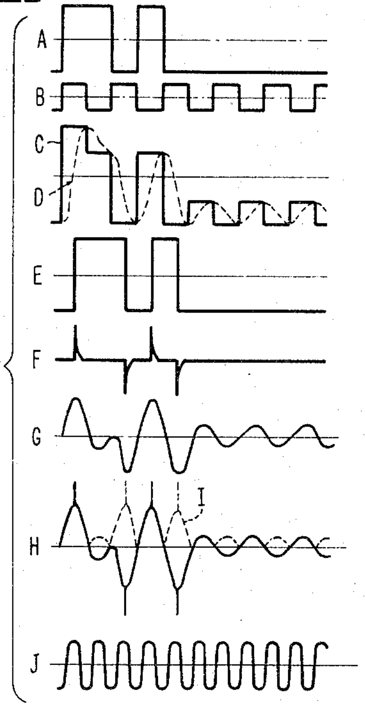

In the drawings:

FIG. 1 is a block diagram illustrating one embodiment of the transmission system of the present invention, FIG. 2 shows signals which may be found at various points in the systems of the present invention, FIG. 3 is a diagram, primarily in block form, of another embodiment of the transmission system in the present invention, FIG. 4 is a diagram, partly in block form, illustrating a third embodiment of the system of the present invention and FIG. 5 shows signals which are present at various points indicated in the embodiment illustrated in FIG. 4 of the drawing.

Referring to FIG. 1 of the drawing in more detail, there is shown in block diagram form one embodiment of the system of the present invention which includes a summing network 10 coupled to a first and second terminals 12 and 14 to which are applied binary signals from first and second data channels (not shown). The output of the summing network 10 is coupled to a modulator 16 which transmits signals through a transmission medium 17, for example, conventional telephone lines, to a demodulator 18 located at a remote point from modulator 16. The output of the demodulator 18 is coupled to a utilization device 20 which may be, for example, a computer or a storage device, and also to a clock circuit 22 which includes a differentiator 24 and a full wave rectifier 26 coupling the differentiator 24 to a tuned circuit 28 tuned to a frequency which provides a wave of a wave length equal to a data bit period. The output of tuned circuit 28 is coupled through a delay 30 to the utilization device 20. The delay 30 is adjusted so that the positive clock signal peaks coincide in time with substantially the midpoints or peaks of the data signals.

The operation of the system illustrated in FIG. 1 may be better understood by referring to the signals illustrated in FIG. 2 of the drawing. Signal A is a series of substantially square waves representing data binary digits received at terminal 12 from a first channel and signal B is a second series of substantially square waves representing data bits received at terminal 14 from a second channel. The source of signals A and B may be, e.g., a computer or a storage device. The signals A and B are applied to the summing network 10 which may be in one simple form a resistive network or in another form a modulator, as indicated hereinbelow, producing composite signals or pulses shown at C of FIG. 2 having four levels identified as 11, 10, 01 and 00 wherein the magnitude of signal A when forming composite signals C is twice that of signal B. The composite signals C when passed through the modulator 16, the transmission medium 17 and demodulator 18 are modified into a four level smooth waveform indicated at D. The four level waveform D is then applied to the utilization device 20. The four level waveform D is applied also to the clocking circuit 22 wherein it is differentiated by differentiator 24 to form a signal E which is the differential wave of waveform D, the peaks of the differential signal E indicating the maximum slope of the transitions in signal D. The differential signal E is then passed through the full wave rectifier 26 which passes pulses of one polarity and inverts pulses of the other polarity to form the series of positive peaks indicated at F. The fully rectified differential signals indicated at F are used to drive the tuned circuit 28 to produce at the output thereof the clocking signals I which are applied to the utilization device 20 through the delay 30.

In FIG. 2 of the drawing there is also shown curves J, K and L which represent transitions in a one bit interval $t$ from the 11 level to the 10, 01 and 00 levels, respectively, of the four level waveform. It can be seen that these transitions do not cross the zero axis at the same point in time in the transition interval $t$. However, curves J, K and L each have a maximum slope which occurs at the same point in time in the transition time $t$ which can be readily detected. One technique which can be employed to detect the maximum slope is to differentiate the transitions. Curves M, N and P which represent the differential waves of the transitions J. K and L, respectively, each have a maximum or peak value which, as can be seen in FIG. 2 at line 32, always occurs at the midpoint in the time interval $t$.

Accordingly, it can be seen that when a waveform having several levels, each of which indicate a bit or item of information, is employed in a transmission system the differential of the transition from one level to any other level of the waveform provides a wave having a peak which occurs at the same point in time regardless of the level at which the transition begins or ends. Since the clocking circuit 22 of the present invention detects a point in the received signal which is a reliable reference point in the data signal, it can be seen that a very reliable clock signal is produced by the system of the present invention which is particularly suitable for deriving clock signals from several level signals.

The embodiment of the system of the present invention illustrated in FIG. 1 is very suitable in general for use in connection with conventional telephone lines or channels. It is known that in a telephone dial up operation a user may be provided with a channel having one of many different characteristics. In situations where the channel is band limited it may not be possible to produce from a single differentiating process a strong driving signal at the frequency to which the tuned circuit is resonant. In order to produce the desired driving signal, a double differentiation process is employed as illustrated in FIG. 3 of the drawing.

In FIG. 3 there is shown a second embodiment of the system of the present invention which utilizes first and second differentiators 24a and 24b, respectively, in a clocking circuit 22'. In the embodiment illustrated in FIG. 3 of the drawing a summing network 10' is indicated by parallelly arranged resistors R and 2R which are connected to ground through a series resistor 11, and the full wave rectifier 26 of FIG. 1 is illustrated as a zero crossing detector 26'.

In the operation of the embodiment illustrated in FIG. 3, a signal such as signal A of FIG. 2 from a first channel is applied to terminal 12 through resistors 2R and 11 to ground and a signal such as signal B of FIG. 2 from a second channel is applied to the second terminal 14 through the resistor R, having a resistance value one half that of resistor 2R, and resistor 11 to ground to form at the common or junction point of resistors R, 2R and 11, which acts as a summing point, a composite waveform such as waveform C of FIG. 2. In waveform C the magnitude of the signal from the second channel passing through resistor R has twice that of the signal from the first channel passing through resistor 2R. The composite signal C is transmitted through the modulator 16, the transmission medium 17 and the demodulator 18 to form at the output of the demodulator 18 the signal D of FIG. 2 which is applied to the utilization device 20 and also to the clocking circuit 22'. In the clocking circuit 22' the signal D passes through a first differentiator 24a to form the differentiated signal E of FIG. 2 which is passed through the second differentiator 24b to provide a signal G, the second derivative of the signal D. The signal G is passed through the zero crossing detector 26' which may be a full wave rectifier providing a fully rectified signal H. The sharp spikes between adjacent half waves of the fully rectified signal H contain a large number of frequency components which are used to drive the tuned circuit 28. The clock signal I is produced at the output of the tuned circuit 28 and applied to the utilization device 20 through the delay 30 which is properly adjusted so as to provide optimum timing in the utilization device 20 between the data signals and the clocking signals. It can be seen that this double differentiation clocking circuit may be used whenever it is desired to detect by zero crossing techniques the peaks of the differentiated wave E produced at the ouptut of the first differentiator 24a. When the single differentiator 24 is used in the clocking circuit 22 illustrated in FIG. 1, the zero crossing detector 26 can detect the peaks of the signal D from the output of demodulator 18.

An important difference between single and double differentiation process is shown clearly in the last bit time of the waveforms E and G of FIG. 2. It should be noted that the width of the last output pulse and thus its spectrum is a function of the amplitude characteristic of the channel, i.e., as the bandwidth is narrowed the pulse widens reducing the component at the clock frequency toward zero and possibly reversing it in phase. This can result in a failure of the clock circuit. A second differentiation converts the single pulse of E into a doublet providing a zero crossing and thus a spike after rectification. The second stage of differentiation can be considered to accentuate the high frequency components at the input to the zero crossing detector 26'.

In FIG. 4 of the drawing there is shown a third embodiment of the system of the present invention wherein clock tone or clock pulses, which may have, for example, a 1010 pattern as indicated at B in FIG. 5 of the drawing or a 100010000 pattern, are applied to a first terminal 36 and a two level data signal, such as that indicated at A of FIG. 5 is applied to a second terminal 34. The clock signal B from terminal 34, which preferably has a magnitude about one tenth that of the data signal A, is applied to a signal modulator 38 which modulates the two level data signals from the second terminal 34 applied to modulator 38, acting as a baseband modulator, to produce a several level waveform as indicated at C of FIG. 5 at the output of the signal modulator 38. The several level waveform C is applied to carrier modulator 40 to modulate the transmission system carrier wave applied to the transmission medium, for example, telephone lines 42. The modulated several level waveform C is passed through a demodulator 44 to provide at the output thereof a signal D which is a modification of the originally produced several level waveform or signal C. The signal D is passed through a zero threshold detector 46, which may be a conventional clipper or limiter, to form the square waves E of FIG. 5 which are similar to the two level data signals A applied to the signal modulator 38 from terminal 34. This reconstructed data signal E is applied to a utilization device 48. A clock circuit 50, shown somewhat in detail in FIG. 4 of the drawing, has a first input coupled to the output of the demodulator 44 and a second input coupled to the output of the zero threshold detector 46. The output of the demodulator 44 is connected to a first differentiator 52 of clock circuit 50 which includes a capacitor 54 and a resistive network 56 as well as a low level; high gain operational amplifier 58 having a PNP transistor 60 and a NPN transistor 62 coupled to an output terminal 64 at which terminal the waveform G of FIG. 5 appears. The output from the zero threshold detector 46 is applied to a second differentiator 66 of the clock circuit 50 which includes a capacitor 68 coupled to the output terminal 64 of the first differentiator 52 which acts as the resistor of the second differentiator 66 to produce the differential spikes indicated at F of FIG. 5. The output terminal 64 acts as a summing point for the parallelly arranged first and second differentiators 52 and 66 for forming a composite signal shown at H of FIG. 5. The composite signal H is passed through a full wave rectifier 70 having a pair of diodes 72, 74 and a centrally tapped step-up transformer 76 providing a waveform at the output thereof as indicated at I. The fully rectified signal I from the output of the full wave rectifier 70 is applied to a tuned circuit 78 which is tuned to the frequency having a wave of the data bit rate to produce the clock signal indicated at J of FIG. 5. The output from the tuned circuit 78 is applied through a suitably delay network 80 to the utilization device 48.

Although a summing point has been provided at the outputs of the two differentiators 52 and 66, it should be understood that the summing point may, for example, precede the two differentiators 52 and 66, if desired.

It has been found that when two level data signals have superimposed thereon a clock tone or clock pulses, occasionally interference occurs between the clock and data signals which reduce to an appreciable extent the magnitude of the retrieved clock signal at the receiver of the transmission system of the present invention when only the first differentiator 52 is employed in the clock circuit 50. By adding the second differentiator 66, a wide range of high amplitude pulses are produced at the output of the second differentiator which supplement the waves from the output of the first differentiator to provide driving pulses to the tuned circuit 78 producing a very reliable clock signal for the transmission system.

Although the embodiment of FIG. 4 of the drawing has been described as a system in which two level or binary data signals are transmitted, it should be understood that the clock signal or pulses from terminal 36 may be superimposed on data signals having the four level waveform as shown at C in FIG. 2 to form an eight level signal. Furthermore, the clock signals or pulses may be combined with multilevel data signals in the summing networks 10 and 10' indicated in FIGS. 1 and 3 as well as in the modulator 38 of FIG. 4.

It should be noted that the maximum allowable time lapse between data transitions is determined by the Q of the tuned circuits when clock signals or pulses are not superimposed on the data signals at the transmitter. By superimposing clock signals on the data signals, there is no coding restriction on the data signals. Transitions also can be guaranteed by employing a special coding, e.g., the use of a four level system which uses a 4 of 8 coding. This guarantee is also available when a coding restriction is placed on data signals applied to one of the two input terminals of the systems, the coding of the data signals applied to the other of the two input terminals being unrestricted.

Accordingly, it can be seen that this invention provides a simple yet very reliable clocking signal when several level, such as, quaternary, signals are used to transmit information through a transmission system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for transmitting digital data signals having transitions therebetween comprising (a) means for transmitting said digital data signals and
(b) a receiver for receiving said signals including
(c) a demodulator,
(d) a utilization device,
(e) a zero threshold detector coupling said demodulator to said utilization device,
(f) a first differentiator coupled to the output of said demodulator,
(g) a second differentiator coupled to the output of said zero threshold detector,
(h) a summing network, the outputs of said first and second differentiators being coupled to said summing network,
(i) a tuned circuit coupled to the output of said summing network and
(j) means for coupling said tuned circuit to said utilization device.

2. A system as set forth in claim 1 wherein said means for transmitting said digital data signals includes (a) a modulator and
(b) means for applying first and second signal channels to said modulator.

3. A transmission system comprising:

(a) a receiver, means for transmitting to said receiver a several level signal having transitions and peaks therein, (b) maximum slope detection means, including two serially arranged differentiators feeding a full wave rectifier, (c) means coupled to said receiver for applying signals to the serially arranged differentiators in said maximum slope detection means, (d) turned circuit means responsive to said maximum slope detection means for producing uniform output waves having peaks therein, and (e) delay means connected to the output of said tuned circuit means for producing a coincidence in time of the peaks of said output means and said several level signals.

References Cited by the Examiner

UNITED STATES PATENTS

| | | | |
|---|---|---|---|
| 2,957,045 | 10/60 | Perry | 178—69.5 |
| 2,975,367 | 3/61 | Adams et al. | 328—127 |
| 2,978,642 | 4/61 | Papineau | 328—127 |

DAVIG G. REDINBAUGH, *Primary Examiner.*